Aug. 7, 1923.
F. D. WINKLEY
LUBRICATING APPARATUS
Filed March 19, 1920
1,463,861
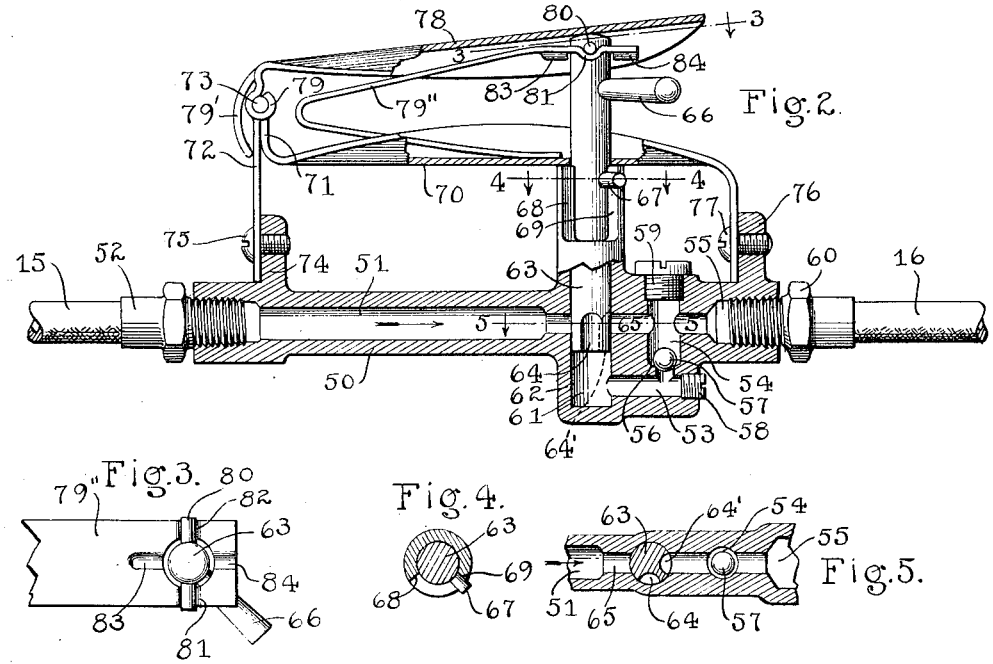
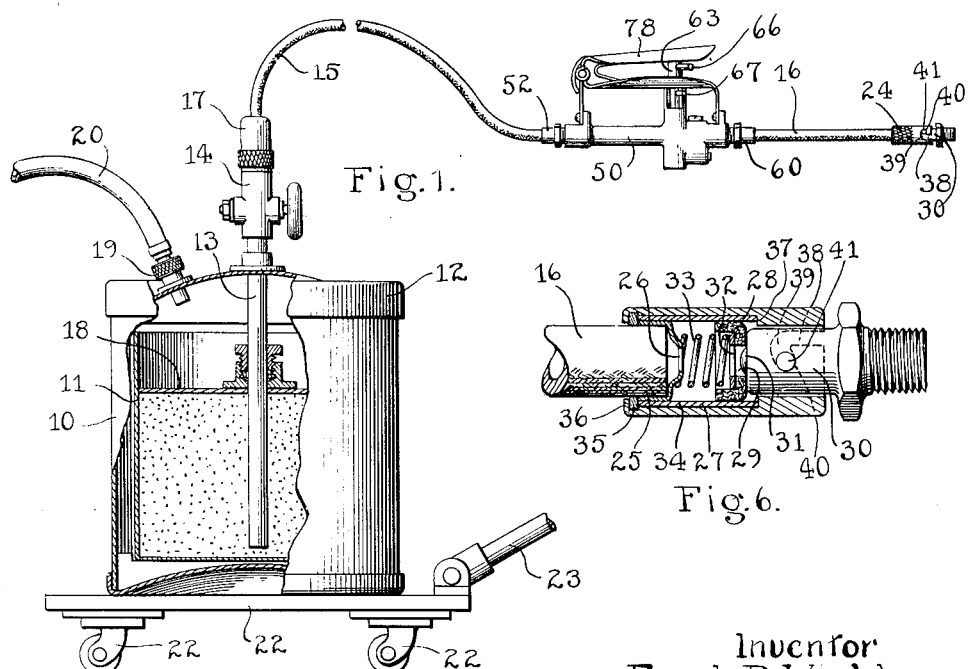
Inventor
Frank D. Winkley
Williams, Bradbury & See
Attorneys.

Patented Aug. 7, 1923.

1,463,861

UNITED STATES PATENT OFFICE.

FRANK D. WINKLEY, OF MADISON, WISCONSIN, ASSIGNOR, BY MESNE ASSIGNMENTS, TO THE BASSICK MANUFACTURING COMPANY, A CORPORATION OF DELAWARE.

LUBRICATING APPARATUS.

Application filed March 19, 1920. Serial No. 367,197.

*To all whom it may concern:*

Be it known that I, FRANK D. WINKLEY, a citizen of the United States, residing at Madison, in the county of Dane and State of Wisconsin, have invented a certain new and useful Improvement in Lubricating Apparatus, of which the following is a full, clear, concise, and exact description, reference being had to the accompanying drawings, forming a part of this specification.

My invention relates to improvements in lubricating apparatus, and is particularly concerned with improvements in lubricating apparatus of that type in which the machine to be lubricated is provided with a plurality of nipples secured to the bearings thereof to which lubricant is supplied by a lubricant compressor having a flexible discharge conduit, the free end of which is provided with a coupling member adapted to be consecutively attached to and detached from the nipples secured to the bearings.

The objects of my invention are:

1. To provide apparatus of the character described comprising a source of lubricant under pressure, having a discharge conduit, one end of which is provided with a coupling member adapted to be attached to and detached from lubricant receiving nipples, the said coupling member being provided intermediate its ends with means for increasing the pressure on the lubricant being supplied to the lubricant receiving member from a source of supply, whereby the lubricant can be forced into bearings offering very high resistance to the passage of lubricant therethrough.

2. To provide means such as described in such a construction that the pressure on the lubricant in the coupling member can be reduced to such an extent that the coupling member can be easily detached from the lubricant receiving nipple and the discharge of lubricant from the free end of the conduit prevented.

3. To provide means of the character described which can be easily operated with one hand, leaving the other hand free to attach the coupling member to and detach it from the nipples.

4. To provide a lubricating apparatus of the character described, which is readily portable so that it can be moved about the mechanism to be lubricated, whereby a short discharge conduit can be used, thereby making it unnecessary to employ more than a moderate pressure to force the lubricant from the source of supply to the pressure raising or increasing means, and thereby reducing the length of the discharge conduit subjected to high pressures to a comparatively short piece.

5. And finally, to provide means of the character described which is simple in construction, economical to manufacture, easy to operate and dependable.

Other objects will appear as this description progresses, reference being had to the accompanying drawings, in which Figure 1 is a side elevation of my improved lubricating apparatus, portions thereof being broken away.

Figure 2 is a central longitudinal section through the means which I employ for controlling the pressure of the lubricant supplied to the nipples.

Figures 3, 4 and 5 are sectional details taken on lines 3, 4 and 5 of Figure 2, and Figure 6 is a central longitudinal section through a coupling member which may form a part of my invention, the coupling member being shown as attached to a lubricant receiving nipple, which is shown in side elevation.

Throughout the several views, similar reference characters will be used for referring to similar parts.

Referring for the present to Figure 1, the reference character 10 indicates a tank or container adapted to receive a receptacle 11, filled with lubricant, and provided with a cover 12 detachably secured thereto in airtight relation by means not shown. A pipe 13 extends through and projects downwardly into the receptacle 11, forming a portion of the discharge conduit for the lubricant. The upper end of the pipe 13 is provided with a valve 14, whereby the flow of lubricant from the receptacle 11 may be controlled if desired. The remainder of the discharge conduit comprises two sections 15 and 16 of flexible metallic hose, the portion 16 of which should be designed to withstand extremely high pressures, although ordinarily it will not be subjected to these pressures which may amount to as much as 2000 or 25000 pounds per square inch. The portion 15 of the flexible discharge conduit is connected with the valve 14 by means of any suitable coupling or union 17.

Slidably mounted upon the pipe 13 forming a part of the discharge conduit is a disk or follower 18, which, when subjected to air pressure, moves downwardly and thus causes the lubricant to be discharged through the discharge conduit. Air under pressure may be admitted to the container 10 through a check valve 19 to which the air may be supplied by a tube 20 (shown in dotted outline), leading from any source of air under pressure.

The details of construction of the container 10, its disclosure, and the means for forcing lubricant therefrom under pressure form no part of my present invention, but are illustrated and claimed in my co-pending application, S. N. 348,923, filed January 2, 1920. So far as my invention is concerned, any other means for providing a source of lubricant under pressure may be employed. It will be noted that the tank or container 10 is mounted upon a small truck comprising the table 21, which is mounted upon suitable casters 22 and may, if desired, be provided with a tongue or handle 23 by means of which it can be rolled or pushed from place to place, as desired.

The free end of the discharge conduit is provided with a coupling member indicated as a whole by the reference character 24, this coupling member being shown in section in Figure 6 and comprising a cap 25 which is soldered to the end of the discharge conduit, the top of this cap being provided with an aperture 26 registering with the bore of the conduit. A sleeve 27 has one end soldered to the cap 25. A flexible gasket 28 of leather or other suitable material is slidably mounted in the other end of the sleeve 27 and is provided with a discharge aperture 29, registering with the opening in the nipple 30, which is caused by the spring-pressed closure 31. A washer 32 is seated in the cup leather or gasket 28 and a helical spring 33 confined between this washer and the end of the cap 25 tends to hold the gasket 28 in the outer end of the sleeve 27. A second sleeve 34 is rotatably mounted upon sleeve 27 and has its inner end swaged over a washer 35, resting against the inner end of the sleeve 27, as shown at 36, to prevent longitudinal displacement of the outer sleeve relative to the inner sleeve. The diameter of the bore in the outer end of the sleeve 34 is slightly less than the diameter of the bore of the sleeve 37, thereby providing an annular shoulder 37 which prevents the gasket 28 from being displaced from the coupling member.

The outer end of the sleeve 34 is provided with bayonet slots disposed diametrically opposite each other, each comprising a portion 38 extending longitudinally of the sleeve, and a portion 39 extending transversely thereof. Each of the transversely disposed of the bayonet slots are recessed as shown at 40 to provide a locking recess for the pin, the construction being such that when the coupling member is attached to the nipple having the bayonet pin 41 extending therethrough, the ends of this pin will be locked in the recesses 40 by the reaction of the pressure of the lubricant, which tends to force the coupling member away from the nipple.

I do not claim as my invention the details of construction of either the nipple or the coupling member described above, except in so far as they co-act with the remaining portions of my apparatus, which I am about to describe, to produce a new result. It is to be clearly understood that my invention is not limited to the details of construction of the above described nipple and coupling member, as I have merely illustrated and described these members also the operation of my apparatus as a whole.

I shall now proceed with the description of the means which I employ for controlling the flow of lubricant to and the pressure of the lubricant in the coupling member, that is, the means by which I control the supply of lubricant to the lubricant receiving nipples or other similar devices.

Intermediate the ends of the discharge conduit, that is, somewhere between the coupling member 24 and the source of lubricant supply, I provide a body member 50 having the intake passageway 51 connected at one end by the union 52 with the portion 15 of the discharge conduit. At its opposite end the body member is provided with a series of bores 53, 54 and 55, forming a discharge passageway intermediate the ends of which is formed a valve seat 56 for the check valve 57 which opens towards the coupling member 24, that is, in the direction of flow of the lubricant. The outer ends of the bores 53 and 54 may be closed by screwed plugs 58 and 59, respectively. The discharge bore 55 is connected by a union 60 with the portion 16 of the discharge conduit.

The inner or adjacent ends of the intake and discharge passageways are connected by the bore 61 of a pump cylinder 62 in which is reciprocably and rotatably mounted the plunger 63 having grooves or recesses 64 and 64' extending upwardly in one side thereof a short distance from the inner end of the plunger. The recess 64 is adapted to be rotated into position to establish communication between the intake passageway and the cylinder, and the passageway 64' is adapted to be rotated into position to establish communication between the discharge passageway and the cylinder. The plunger 63 may be turned to either of its two positions by means of a small pin 66 extending therefrom near its upper end. The angular movement of the plunger 63 is limited by the pin 67 which co-acts with the stops 68 and 69 formed by cutting away a portion of the cylinder wall to determine the angular position of the plunger.

The reference character 70 indicates a concavo-convex sheet metal hand-grip, one end 71 of which is bent at substantially right angles then reversely bent upon itself, as shown at 72, to provide a support for the pivot pin 73. The end 72 is secured to the lug 74 by means of a screw 75. The opposite end of the hand-grip 70 is bent downwardly and secured to the lug 72 by the screw 77. I provide a second hand-grip 78, one end of which is provided with a pair of eyes 79, only one of which is shown, for pivotally mounting this hand-grip upon the pivot pin 73. The hand-grip 78 is provided with an extension 79′ which limits the upward movement thereof by engagement with the portion 72 of the hand-grip 70.

The upper end of the plunger 63 extends through an opening in the lower hand-grip 70 and its top end engages the lower side of the hand-grip 78. Consequently, when the hand-grip 78 is forced toward the hand-grip 70 the plunger is forced inwardly for returning the plunger to its retracted position. I provide a spring 79″, one end of which engages the hand-grip 70 and the other end of which is provided with an opening through which the upper end of the plunger 63 extends. The plunger 63 is, at its upper end, provided with a pin 80, the ends of which are adapted to rest either in the depressions 81 and 82, or the depressions 83 and 84 formed in the spring 79 depending upon the angular position to which the plunger has been urged through the pin 66. It will be seen that the depressions 81, 82 and 83, 84 serve to hold the plunger in its adjusted positions.

In operation, air under pressure is forced into the tank or container 10, thereby placing the lubricant in the receptacle 11 under pressure. The valve 14 is then adjusted to permit a flow of lubricant into the discharge conduit. The coupling member 24 is then connected with a nipple to be supplied with lubricant, and the pin 66 moved to cause the port 64 to establish communication between the intake passageway and the cylinder. The lubricant thereupon flows through the cylinder, the discharge passageway, and the remainder of the discharge conduit, and if the pressure in the tank 10 is sufficient to force the lubricant to the nipple, the lubricant is permitted to flow until the bearing is filled. If the pressure is insufficient for this purpose the operator, by moving the grip 78 to the grip 70, causes the plunger 63 to place the lubricant in a cylinder under pressure, and in this manner, forces the lubricant into the nipple. When this has been accomplished, the operator permits the spring 79 to retract the plunger from the cylinder, having first turned the plunger to the position shown in Figure 5. As the plunger moves upwardly it creates a vacuum in the cylinder 61 and as soon as the recess 64 establishes communication with the by-pass 65 this suction exerted upon the lubricant in that portion of the discharge conduit connected with the coupling member tends to cause the lubricant to be sucked back into the cylinder and thereby relieves the pressure upon the coupling member. The coupling member is then detached from the nipple, attached to the next one, and the process repeated until the mechanism is entirely lubricated.

While I have described the details of the preferred embodiment of my invention, it is to be clearly understood that my invention is not limited to these details, but is capable of other adaptations and modifications within the scope of the appended claims.

Having thus described my invention, what I claim and desire to secure by U. S. Letters Patent, is:

1. The combination with a lubricant receiving member, and means for supplying lubricant thereto, comprising a source of lubricant under pressure, a discharge conduit therefor having a coupling member on the free end thereof, and co-acting means on said nipple and coupling member for detachably connecting said coupling member to said nipple, of means intermediate the ends of said discharge conduit for varying the pressure on the lubricant supplied to said nipple, comprising a body member having intake and discharge passageways, and a pump cylinder connecting said passageways, a check valve in said discharge passageway opening towards said coupling member, said body member being provided with a by-pass around said check valve connecting said pump cylinder and said discharge passageway, a plunger reciprocable and rotatable in said pump cylinder and having a recess formed in its inner end for establishing communication between said intake passageway and said pump cylinder, or between said pump cylinder and said by-pass, means whereby said plunger can be rotated, a hand-grip for reciprocating said plunger, and a spring for retracting said plunger, the said spring comprising means for holding said plunger in either of its angularly adjusted positions.

2. The combination with a lubricant receiving member, and means for supplying lubricant thereto, comprising a source of lubricant under pressure, a discharge conduit therefor having a coupling member on the free end thereof, and co-acting means on said nipple and coupling member for detachably connecting said coupling member to said nipple, of means intermediate the ends of said discharge conduit for varying the pressure on the lubricant supplied to said nipple, comprising a body member having intake and discharge passageways, and a pump cylinder connecting said passageways, a check valve in said discharge passageway opening towards said coupling member, said body member being provided with a by-pass around said check valve connecting said pump cylinder and said discharge passageway, a plunger reciprocable and rotatable in said pump cylinder and having a recess formed in its inner end for establishing communication between said intake passageway and said pump cylinder, or between said pump cylinder and said by-pass, means whereby said plunger can be rotated, and means for reciprocating said plunger.

3. The combination with a lubricant receiving member, and means for supplying lubricant thereto, comprising a source of lubricant under pressure, a discharge conduit therefor having a coupling member on the free end thereof, and co-acting means on said nipple and coupling member for detachably connecting said coupling member to said nipple, said connecting means comprising means responsive to the pressure of the lubricant in said coupling member for locking said coupling member to said nipple, of means intermediate the ends of said discharge conduit for varying the pressure on the lubricant supplied to said nipple, comprising a body member having intake and discharge passageways, and a pump cylinder connecting said passageways, a check valve in said discharge passageway opening towards said coupling member, a plunger reciprocable in said pump cylinder, and means for reciprocating said plunger.

4. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, of means intermediate the ends of said discharge conduit for increasing or decreasing the pressure of the lubricant supplied to said lubricant receiving member by said source, comprising a body member having an intake passageway for receiving lubricant from said source, a discharge passageway, and a pump cylinder connecting said passageways, a plunger reciprocable in said pump cylinder, a check valve in said discharge passageway opening towards said coupling member, said body member having a by-pass around said check valve connecting said pump cylinder and said discharge passageway, and a passageway formed in said plunger for controlling communication between said cylinder and said intake passageway, and between said cylinder and said by-pass.

5. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, of means intermediate the ends of said discharge conduit for increasing or decreasing the pressure of the lubricant supplied to said lubricant receiving member by said source, comprising a body member having an intake passageway for receiving lubricant from said source, a discharge passageway, and a pump cylinder connecting said passageways, a plunger reciprocable in said pump cylinder, a check valve in said discharge passageway opening towards said coupling member, said body member having a by-pass around said check valve connecting said pump cylinder and said discharge passageway, the said plunger comprising means for controlling communication between said cylinder and said intake passageway, and between said cylinder and said by-pass.

6. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, said connecting means comprising means responsive to the pressure of the lubricant in said coupling member for locking said coupling member to said nipple, of means intermediate the ends of said discharge conduit for increasing the pressure of the lubricant supplied to said lubricant receiving member by said source, comprising a body member having an intake passageway for receiving lubricant from said source, a discharge passageway, and a pump cylinder connecting said passageways, a plunger reciprocable in said pump cylinder, a check valve in said discharge passageway opening towards said coupling member, the said plunger comprising means for controlling communication between said cylinder and said intake passageway.

7. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, of means intermediate the ends of said discharge conduit for decreasing the pressure of the lubricant supplied to said lubricant receiving member by said source, comprising a body member having an intake passageway for receiving lubricant from said source, a discharge passageway, and a pump cylinder connecting said passageways, a plunger reciprocable in said pump cylinder, a check valve in said discharge passageway opening towards said coupling member, said body member having a by-pass around said check valve connecting said pump cylinder and said discharge passageway, the said plunger comprising means for controlling communication between said cylinder and said intake passageway, and between said cylinder and said by-pass.

8. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, of means intermediate the ends of said discharge conduit for increasing or decreasing the pressure of the lubricant supplied to said lubricant receiving member by said source.

9. The combination with a lubricant receiving member, and means for supplying lubricant thereto, comprising a source of lubricant under pressure, a discharge conduit therefor having a coupling member at its free end, and co-acting means on said lubricant receiving member and said coupling member for detachably connecting said members, of means intermediate the ends of said discharge conduit for increasing the pressure of the lubricant supplied to said lubricant receiving member by said source.

10. A portable apparatus for lubricating machinery comprising a receptacle for lubricant, means for subjecting the lubricant in said receptacle to pressure, a discharge conduit for said receptacle having a coupling member at its free end, and means intermediate said receptacle and coupling member for increasing or decreasing the pressure of the lubricant in said coupling member.

11. A portable apparatus for lubricating machinery comprising a receptacle for lubricant means for subjecting the lubricant in said receptacle to pressure, a discharge conduit for said receptacle having a coupling member at its free end, and means intermediate said receptacle and coupling member for increasing the pressure of the lubricant in said coupling member.

12. In a lubricant pump the combination with a low pressure chamber having a discharge orifice, and a body member having a high pressure cylinder extending transversely thereof, said body member having an inlet bore extending longitudinally thereof for establishing communication between said low pressure chamber and said high pressure cylinder and at the bore communicating with and extending from the opposite side of one end of said high pressure cylinder, a plunger slidably mounted in said high pressure cylinder and extending outwardly from the end of said high pressure cylinder opposite said outlet bore, and a lever pivotally mounted on said body member and connected with said plunger, said lever extending substantially parallel with said inlet bore.

13. In a lubricant pump, the combination with a low pressure chamber having a discharge orifice, of a body member having a high pressure cylinder extending transversely thereof, said body member having an inlet bore extending longitudinally thereof for establishing communication between said low pressure chamber and said high pressure cylinder and an outlet bore communicating with and extending from the opposite side of one end of said high pressure cylinder, a plunger slidably mounted in said high pressure cylinder and extending outwardly from said high pressure cylinder, and a lever pivotally mounted on said body member and connected with said plunger, said lever extending substantially parallel with said inlet bore.

14. In a lubricant pump, the combination of a body member having a high pressure cylinder extending transversely thereof, said body member having an inlet bore extending longitudinally thereof communicating with said high pressure cylinder, and an outlet bore communicating with and extending from the opposite side of one end of the high pressure cylinder, a plunger slidably mounted in said high pressure cylinder and extending outwardly from said high pressure cylinder and a lever pivotally mounted on said body member and connected with said plunger.

15. The combination with a lubricant compressor comprising a piston for subjecting the lubricant in said compressor to a comparatively low pressure, said compressor having a discharge opening, of a second compressor communicating with said discharge opening, said second compressor including a cylinder and a plunger operating therein for subjecting the lubricant in said second compressor to comparatively high pressure, and for automatically interrupting communication between said first named compressor and said cylinder.

16. A lubricant pump comprising a body member having an inlet bore and an outlet bore extending longitudinally thereof, the outer ends of both bores being internally threaded, said body member having a cylinder formed therein communicating with the inner ends of said inlet and outlet bores and extending transversely of said body member, a plunger reciprocable in said cylinder and a lever for operating said plunger pivotally mounted on said body member and extending substantially parallel with said inlet bore.

17. A lubricant pump comprising a body member having an inlet bore and an outlet bore extending longitudinally thereof, said body member having a cylinder formed therein communicating with the inner ends of said inlet and outlet bores, a plunger reciprocable in said cylinder and a lever for operating said plunger, said lever being pivotally mounted on said body member.

In witness whereof, I hereunto subscribe my name this 16th day of March, 1920.

FRANK D. WINKLEY.

Witnesses:
    EDNA V. GUSTAFSON,
    ANDREW WINTERCORN.